Jan. 30, 1940.    R. H. FOLSOM    2,188,811
AIR CONDITIONING PLANT
Filed April 25, 1938    2 Sheets-Sheet 1
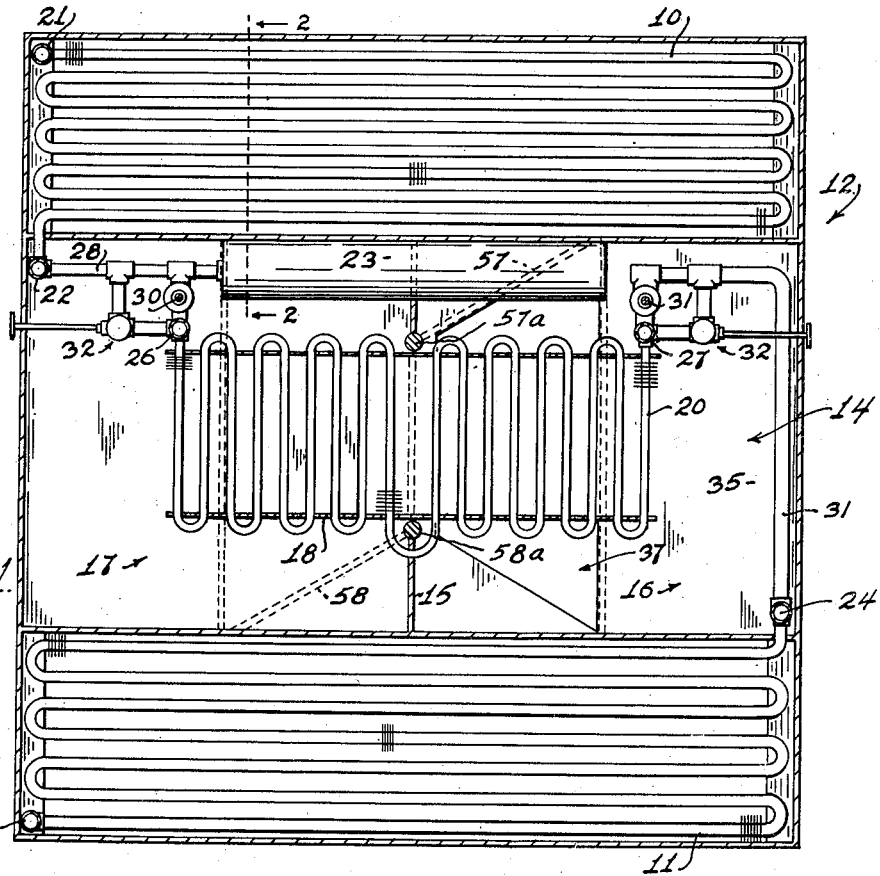
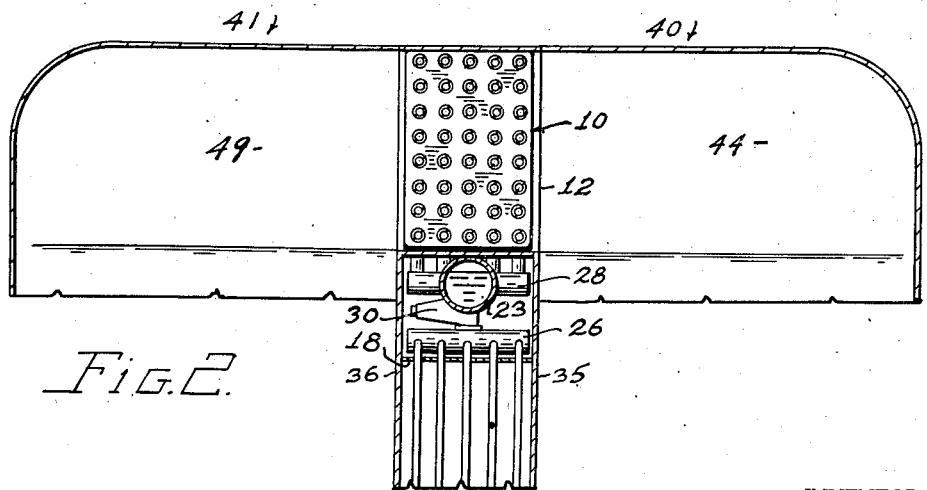
INVENTOR.

Jan. 30, 1940.   R. H. FOLSOM   2,188,811
AIR CONDITIONING PLANT
Filed April 25, 1938   2 Sheets-Sheet 2

INVENTOR.
Robert H. Folsom

Patented Jan. 30, 1940

2,188,811

UNITED STATES PATENT OFFICE 2,188,811

AIR CONDITIONING PLANT

Robert H. Folsom, Los Angeles, Calif.

Application April 25, 1938, Serial No. 204,043

4 Claims. (Cl. 62—129)

My invention relates to air conditioning and refrigeration-heating, particularly where a refrigerant is evaporated in thermal contact with outdoor air and is compressed and then condensed in thermal contact with indoor air.

The primary object of the invention is an efficient, low-cost and compact unit embodying an air-cooling evaporator coil, an air-heating condenser coil, together with such air-moving and controls as will provide for efficient heating, cooling, and moisture control thruout all seasons of the year, merely by connecting the unit with a common refrigeration compressor of suitable capacity.

Easy change from heating to cooling and vice versa, are among the objects of the invention, and a particularly important object is to provide for easily and economically defrosting the evaporator coil whenever required.

Another object is to provide for moving lesser amounts of air over the condenser when it is serving as the means for heating indoor air, and greater amounts of air over same when it is serving as a condenser in warm weather. Likewise with the evaporator it is an object to move relatively large amounts of cold atmospheric air over same to absorb heat with the minimum temperature differential, but to limit the amount of air moved in the cooling season in order to provide combined cooling and dehumidification.

A constant supply of outside or atmospheric air to the conditioned space is another object of the invention as is also the reduction of certain thermodynamic losses common to the usual refrigeration cycle.

Ease of installation in old buildings is another object of the invention as is also the provision of a unit which in small sizes may be provided as a "ductless" local unit but which in large sizes can be used as a central air conditioning plant.

Still another object of the invention is the provision of means whereby air heating may be carried on simultaneously with air dehumidification so that dew points may be controlled in damp weather when cooling would be objectionable.

Other objects and advantages will appear hereinafter and include low cost mass production and a unit which a high percentage of home owners can afford so that more electricity will be used for heating purposes with consequent conservation of natural fuels.

I have illustrated by the accompanying drawings one useful embodiment of my invention. In the drawings:

Figure 1 is a vertical mid-section of said embodiment.

Figure 2 is a fragmentary section seen on line 2—2 of Fig. 1.

Figure 3:
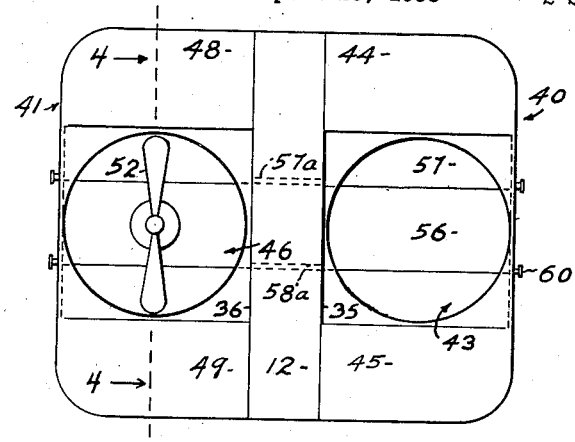
Figure 3 is a face view of the unit seen from out-of-doors.

The condenser, of the usual fin-and-tube type is indicated at 10 and the evaporator is indicated at 11; both being here shown as positioned one above the other in the same vertical plane and mounted in a frame 12 common to both. Between them frame 12 provides a space 14, which by a vertical partition 15 is divided respectively into an outdoor chamber 16 and an indoor chamber 17. In the space is a fresh air duct 18 open at each end to the corresponding chamber and passing thru the partition 15. In the duct 18 there is provided an elongated fin-and-tube coil 20 hereinafter known as the fresh air coil.

The condenser begins with a compressed vapor manifold 21 to receive compressed vapor from any suitable compressor (not shown), and terminates in a liquid manifold 22 to which there is connected the usual receiver 23. The evaporator is provided with the usual manifold 24 to distribute partially expanded liquid to the coils, and terminates in the usual suction manifold 25 thru which vapor is drawn off by the said compressor.

Coil 20 begins with the manifold 26 and ends with the manifold 27. The line 28 which connects the receiver 23 with the condenser is fitted with a common expansion valve 30 and this valve 30 connects with the manifold 26 of coil 20. A second and similar expansion valve 31 connects the manifold 27 of coil 20 with a line 31 leading to the manifold 24 of the evaporator. Around each expansion valve there is provided a valve-controlled by-pass such as 32 so that either expansion valve may be rendered inoperative as such by opening the corresponding by-pass. When expansion valve 30 is by-passed the coil 20 becomes substantially a part of the liquid receiver and contains only liquid under pressure, while when valve 30 is operative and valve 31 is by-passed coil 20 becomes a part of the evaporator.

The frame and assembly of coils provides a complete self-contained unit which connected with a compressor provides a complete refrigerant cycle which should be manufactured and tested all in the factory and charged with an amount of liquid refrigerant sufficient to fill coil 20 and a part of the receiver, and in which unit the receiver is large enough to hold the entire charge. Tho not essential to design or to the operation, the evaporator and condenser are shown as of reduced height and increased length as compared with a square coil, and as will appear from Figure 5 particularly, the frame projects forwardly and rearwardly of the parts about to be described. The space 14 is closed at each side of the frame by side walls 35 and 36 respectively. The side wall 35 is provided with fresh air inlets 37 which open to the fresh air outdoor chamber 16 of space 14, while the side wall 36 is provided with fresh air outlets 38 leading from the indoor chamber 17 of space 14.

Air is supplied to the coils as required, and directed away from the coils as required, by a pair of damper-box units 40 and 41 respectively; which units by reason of their design and function should more correctly be known as "four-way" valves, and which are so termed hereinafter.

The four-way-valve 40 is known as the inlet valve and is provided respectively with an indoor air inlet opening 42 at the front thereof and centrally thereof, and with an outdoor air inlet opening 43 at the rear thereof and directly opposed to opening 42. At the upper end the valve 40 terminates in an outlet branch 44 which alines directly with the condenser, and at the lower end this valve terminates in a branch 45 which alines with the corresponding side of the evaporator.

The fourway-valve 41 is similar to valve 40 and is placed on the opposite side of the frame but its front and rear openings 46 and 47 serve respectively as the out-door air outlet (46) and the indoor air outlet (47); while its branches 48 and 49 respectively are known as inlets, the branch 48 leading from the condenser and the branch 49 leading from the evaporator.

It will be apparent that the four-way-valves function in the customary manner in that in the case of valve 40 either inlet may be in communication with either outlet branch while the other inlet is in direct communication with the other outlet branch. In the case of valve 41 either inlet branch may be in direct communication with either outlet opening while the other inlet branch is in direct communication with the other outlet opening. Any suitable means may be provided for moving two streams of air; one into the outdoor inlet of valve 40 and one into the indoor inlet of valve 40, and in the present form of the invention such means is shown in the form of an indoor air fan 51 and an outdoor air fan 52; fan 51 being in the indoor outlet of valve 40 and fan 52 being in the outdoor outlet of the same valve. This provides that the fans are opposite and coaxial and may both be driven by a single motor 53.

While the complete unit including the coil frame and the abutting valves 40 and 41 may be variously installed, the drawings show the unit as fitted directly in the wall 54 of a building with the indoor side projecting into the building and with the outdoor side projecting out-of-doors.

The diagonal movable member or plug common to usual four-way valves is indicated for each of these valves by the numerals 56, 57 and 58 respectively; each member being in three parts and in the form of what may be termed a "butterfly" and comprising a body 56 and two wings 57 and 58 respectively. The motor 53, in this embodiment is supported in the corresponding body 56. The indoor fan 51 being smaller and of less air moving capacity than the outdoor fan 52, the coils at any time subject to outdoor air receive more air than do the coils then subject to indoor air; this in keeping with a feature of the invention.

The outdoor inlets 37 of space 14 and provided in wall 35 are arranged or positioned so that they are always in direct communication with the out-of-doors. Via the fan 51 outdoor air, in continuous but moderate amount is drawn in thru inlets 37. Outlets 38 are positioned so that they are always in communication with the indoors via the fan 51 so that this supply of fresh air, after passing over coil 20 is discharged indoors along with the recirculated air normally handled by the fan 51.

Each of the said wings of each valve are movable from full line position to broken line position altho in the embodiment shown herein both of the upper wings 57 are connected to a shaft 57a while the lower wings 58 are connected to a shaft 58a. These shafts extend entirely thru the unit and terminate in knobs 60 so that the shafts may be turned independently to set the wings as required. It will be understood that while hereinafter the wings are described as manually operated they may be controlled for air conditioning, defrosting, reheating and like operations by suitable automatic devices such as are well understood in the art.

With any suitable compressor operating to supply compressed vapor to the condenser and to withdraw low pressure vapor from the evaporator at rates varying with the then existing demand, operation is as follows:—The fans are operated continuously when any air conditioning is required and in heating reason the wings are all set in full line position as shown particularly in Fig. 4.

Figure 4:
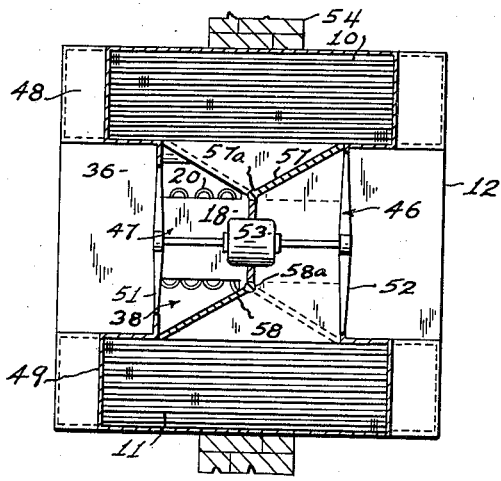
Figure 4 is a section seen on line 4—4 of Fig. 3; this view showing the unit installed in a building wall.
Figure 5:
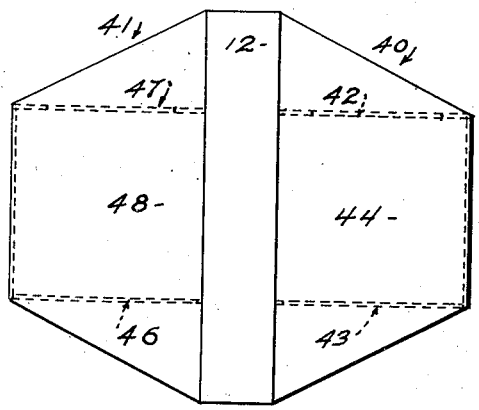
Figure 5 is a plan view of the unit.

With reference to Figs. 3, 4 and 5 particularly, indoor fan 51 now acts to draw indoor air in thru inlet 52, up into branch 44 of damper-box 40, over the condenser coil 10 into branch 48 of damper-box 41 and then down to and thru outlet 47, from where the fan 51 moves the now heated air back into the room. Frame 12 tends to separate air leaving outlet 47 from mixing with air entering inlet 42.

Meanwhile the outdoor fan 52 draws atmospheric air in thru inlet 43, down into branch 45 of damper-box 40, over the evaporator coil 11 into branch 49 of damper-box 41, and then up to and thru outlet 46. From outlet 46 this refrigerated air, which has given up heat to generate vapor in the evaporator 11, is discharged back to the atmosphere in a stream which, by frame 12, is kept separate from the air then entering inlet 43.

At times during this method for extracting low temperature heat from outdoor air and delivering it as useful heat to indoor air, frost will form on coil 11 and tend to reduce the efficiency of same and retard flow of air. This will cause the fan 52 to show increasing suction or reduced capacity and when this becomes evident the lower wings 58, either manually or by reason of this increased suction, are moved. To move the wings 58 for defrosting, the shaft 58a is turned anti-clockwise (Fig. 4) approximately 90 degrees which brings the wings 58 into the broken line position. The upper wings 57 remain unchanged. Now fan 52 is shut off from both evaporator and condenser and can only churn air. Meanwhile fan 51 is free to draw some air from inlet 42, up into branch 44, over the condenser coil 10, into branch 48 and down to and thru outlet 47. However this fan will also act to move an equal amount of indoor air from inlet 42, down into branch 45, over the evaporator 11 into branch 49 and then up to and thru outlet 47 where the cooled air which has just passed over the evaporator is mixed with the warmed air which has just passed over the condenser. The warm room air passing over the evaporator will melt the frost therefrom and dry the coil surfaces and defrosting is thereby quickly accomplished while the mixture which the fan 51 then discharges to the room is not cold or objectionable.

For cooling as in summer weather both shafts 57a and 58a are moved anti-clockwise (Fig. 4) to dispose wings 57 and wings 58 in broken line position where they bring the outdoor openings 43 and 46 respectively into communication with the condenser 11 and bring the indoor openings 42 and 47 in communication with the evaporator. Now fan 51 draws indoor air in thru inlet 42, down in to branch 45 of damper-box 40, over the evaporator coil 11 into branch 49 of damper-box 41, and then up to and thru the indoor outlet 47 back to the room. Thus indoor air is circulated and cooled. Meanwhile fan 52 is drawing outdoor air in thru inlet 43, up into branch 44 of box 40, over the condenser coil 10 into branch 48 of box 41 and then down to and thru outlet 46 back to the atmosphere. Thus atmospheric air is moved over the condenser.

There will be times in mild but humid summer weather and in damp but not very cold spring and fall weather, when it is advantageous for comfort, health, and protection of interior furnishings, to lower the indoor dew point. This is done by having the damper wings in the same position as that just described for defrosting. Then some indoor air is moved over the evaporator and due to the reduced amount of air the evaporator will materially lower its temperature and dew point. At the same time some indoor air is heated by passing over the condenser but the admixture of cooled air and heated air which is discharged by fan 51 into the room will not appreciably heat the room. If even this amount of heat is too much the upper wings 57 may be moved to a suitable intermediate position so that fan 52 will move a small amount of outdoor air in thru inlet 43, over the condenser and then thru outlet 46 back to the atmosphere so that some heat is thrown out-of-doors while other heat of the condenser heats some recirculating indoor air to fully or partially offset the cooling effect of air which has been moved over the evaporator for dehumidification.

It will be apparent now that the unit provides "heat" and "cold" on tap and provides for distributing both thermal effects in various proportions as required between indoor air and outdoor air; thus meeting all possible air-conditioning requirements for the year.

In Figures 1 and 4 it is seen that openings 37 and 38 respectively are always on opposite sides of the dampers, for all damper positions. In other words the opening 37 is virtually out-of-doors at all times while the opening 38 is at all times indoors but subject to the suction effect of fan 51. Thus no matter what may be the position of the damper wings the indoor fan 51 acts to draw outdoor air thru inlet 43, then thru opening 37 (see Fig. 1) then into chamber 16, then thru duct 18 over coils 20 into chamber 17, and then (see Fig. 4) from chamber 17 thru opening 38 to indoor air inlet 47. Thus while this will be a small amount of air as compared with that additionally moved by fan 51, it will provide a constant flow of ventilating air from out-of-doors to indoors over the pre-heating coil 20.

When the outdoor air is below required indoor temperature by-pass valve 32 is opened and by-pass valve 32 around the expansion valve 31 is closed so that the expansion valve 31 serves only the evaporator coil 11. This causes the coil 20 to pass condensate from the condenser 10 counter-current to the fresh ventilating air moving thru duct 18, and the fresh air is thereby heated while the condensate is cooled so that by the time it reaches expansion valve 31 it contains little heat above evaporator temperature and expansion valve heat loss is reduced to a practical minimum.

When the outside air supplied thru dust 18 is to be cooled and particularly dehumidified the by-pass around expansion valve 31 is opened and the by-pass around expansion valve 30 is closed so that expansion begins in coil 20 and this coil becomes a part of the evaporator. Due to the relatively great depth of this coil along the line of air flow and due to the moderate amount of air moved over it, the incoming fresh air is very materially dehumidified in summer weather. While this dehumidified air will be objectionably cold in summer and might otherwise be too heavy, it mixes with recirculating indoor air as it issues from opening 38 and passes to the fan 51.

Generally speaking, this invention provides both heat and "cold" on tap at all times and in varying combinations and makes practically all forms of air conditioning possible both for human comfort as well as for industrial purposes. In the foregoing I have been specific as to construction, arrangement of parts, method and conditions of operation, etc., etc., but only by way of example and explanation and not by way of imposing limitations to the broad scope of the invention as defined by the appended claims.

I claim:

1. In an air conditioning unit, a condenser, and an evaporator, means for moving indoor air over said condenser, means for moving outdoor air over said evaporator, means movable to render the second named means inoperative and causing the first named means to then move indoor air simultaneously over both the evaporator and the condenser.

2. In an air conditioning plant, an evaporator, means for moving either indoor air or outdoor air selectively over same, a condenser, means for moving either indoor air or outdoor air selectively over same, a coil connecting said condenser with said evaporator, means for moving outdoor air continuously over said coil, an expansion valve between said condenser and said coil, a second expansion valve between said coil and said evaporator, a by-pass valve around the first named expansion valve adapted to be opened when outdoor air is moved over said evaporator and indoor air is moving over said condenser and to be closed when indoor air is moving over said evaporator and outdoor air is moving over said condenser, and a second by-pass valve around the second named expansion valve to be opened when the first named by-pass valve is closed and to be closed when the first named by-pass valve is open.

3. In an air conditioning plant a condenser coil, an evaporator coil, a damper box having an indoor inlet opening at the front thereof, an outdoor inlet at the rear thereof, and a pair of spaced outlet openings in the side thereof; the condenser being disposed across one of said outlets and the evaporator being disposed across the other of said outlets, a second damper box having an indoor outlet in the front thereof, an outdoor outlet in the rear thereof, and a pair of spaced inlets in the side thereof one directly at the evaporator and the other directly at the condenser, means for moving air from said indoor inlet to said indoor outlet, means for moving air from said outdoor inlet to said outdoor outlet, and dampers in said boxes movable to any preselected of three positions in one of which the first named means acts to move air over the condenser while the second named means moves air over the ecaporator, and in the second of which positions the first named means moves air over the evaporator while the second named means moves air over the condenser, and in the third of which positions the second named means is rendered inoperative while the first named means moves air over the condenser and evaporator simultaneously.

4. The air conditioning plant as in claim 3 and further including an air-heating liquid-cooling coil connecting said condenser with said evaporator, and a fresh air duct for said last named coil having one end opening into a damper box adjacent the indoor outlet and the other end opening into a damper box adjacent an outdoor inlet; one of said air moving means operating in all positions of said dampers to move outdoor air continuously thru said duct.

ROBERT H. FOLSOM.